United States Patent
Schmitt

(10) Patent No.: US 7,017,611 B2
(45) Date of Patent: Mar. 28, 2006

(54) ONE-PIECE MANIFOLD FOR A REVERSE OSMOSIS SYSTEM

(75) Inventor: Craig A. Schmitt, Phoenix, AZ (US)

(73) Assignee: Watts Regulator C., North Andover, MA (US)

(*) Notice: Subject to any disclaimer, the term of this patent is extended or adjusted under 35 U.S.C. 154(b) by 0 days.

(21) Appl. No.: 10/771,621

(22) Filed: Feb. 4, 2004

(65) Prior Publication Data
US 2004/0238423 A1 Dec. 2, 2004

Related U.S. Application Data

(60) Provisional application No. 60/444,864, filed on Feb. 4, 2003, provisional application No. 60/456,153, filed on Mar. 20, 2003, provisional application No. 60/519,364, filed on Nov. 12, 2003, provisional application No. 60/537,363, filed on Jan. 20, 2004.

(51) Int. Cl.
F15D 1/02 (2006.01)

(52) U.S. Cl. .............................. 138/43; 138/45; 138/46; 210/117

(58) Field of Classification Search ............... 138/43, 138/45, 46; 210/117
See application file for complete search history.

(56) References Cited

U.S. PATENT DOCUMENTS

| | | | | |
|---|---|---|---|---|
| 2,323,115 A | * | 6/1943 | Bryant | 138/43 |
| 2,568,123 A | * | 9/1951 | Goldberg | 138/43 |
| 2,658,528 A | * | 11/1953 | Ifield | 138/43 |
| 3,095,006 A | * | 6/1963 | Smith | 137/269.5 |
| 3,143,145 A | * | 8/1964 | Kauss | 138/43 |
| 3,152,617 A | * | 10/1964 | Justus et al. | 138/43 |
| 3,337,180 A | * | 8/1967 | Carlton | 251/121 |
| 3,693,657 A | * | 9/1972 | Olson | 137/883 |
| 3,746,640 A | | 7/1973 | Bray | |
| 3,934,812 A | * | 1/1976 | Pett | 251/45 |
| 4,044,991 A | * | 8/1977 | Waller | 251/122 |
| 4,089,350 A | * | 5/1978 | Gustin | 138/45 |
| 4,256,284 A | * | 3/1981 | Balhouse | 251/126 |
| 4,344,826 A | | 8/1982 | Smith | |
| 4,632,359 A | * | 12/1986 | Tooth | 251/126 |
| 4,784,763 A | | 11/1988 | Hambleton et al. | |
| 5,006,234 A | | 4/1991 | Menon et al. | |
| 5,082,557 A | | 1/1992 | Grayson et al. | |
| 5,122,265 A | | 6/1992 | Mora et al. | |
| 5,160,608 A | | 11/1992 | Norton | |
| 5,282,972 A | | 2/1994 | Hanna et al. | |
| 5,435,909 A | | 7/1995 | Burrows | |
| 5,460,716 A | | 10/1995 | Wolbers | |
| 5,527,433 A | * | 6/1996 | Begemann et al. | 162/216 |
| 5,565,063 A | * | 10/1996 | Begemann et al. | 162/216 |
| 5,580,444 A | | 12/1996 | Burrows | |
| 5,639,374 A | | 6/1997 | Monroe et al. | |
| 5,879,558 A | | 3/1999 | Monroe et al. | |
| 5,976,363 A | | 11/1999 | Monroe et al. | |
| 5,997,738 A | | 12/1999 | Lin | |
| 6,272,468 B1 | | 8/2001 | Melrose | |

(Continued)

*Primary Examiner*—James Hook
(74) *Attorney, Agent, or Firm*—Fish & Richardson P.C.

(57) ABSTRACT

A one-piece manifold for a reverse osmosis system includes a filter configured to receive water from a water port and a membrane configured to receive filtered water via a first conduit. The membrane is also configured to send permeate water to a reverse osmosis tank. The manifold also includes a flow restrictor configured to receive concentrate water from the membrane via a second conduit and to pass the concentrate water to a drain port.

20 Claims, 16 Drawing Sheets

U.S. PATENT DOCUMENTS

| | | | |
|---|---|---|---|
| 6,401,758 B1 * | 6/2002 | Ziv-Av | 138/43 |
| 6,436,282 B1 | 8/2002 | Gundrum et al. | |
| 6,524,472 B1 | 2/2003 | Monroe | |
| 6,524,483 B1 | 2/2003 | Monroe | |
| 2005/0115875 A1 * | 6/2005 | Schmitt | 210/97 |
| 2005/0173317 A1 * | 8/2005 | Schmitt | 210/109 |

\* cited by examiner

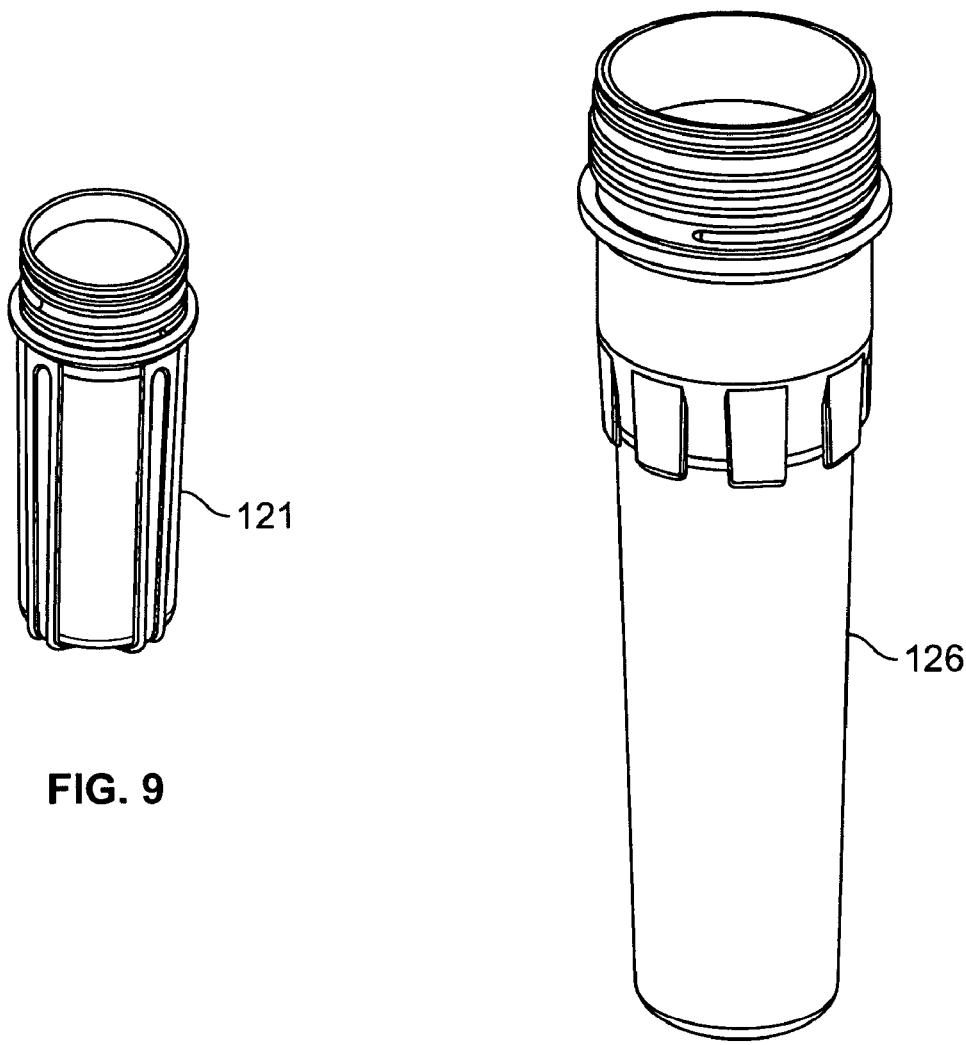
FIG. 9
FIG. 10
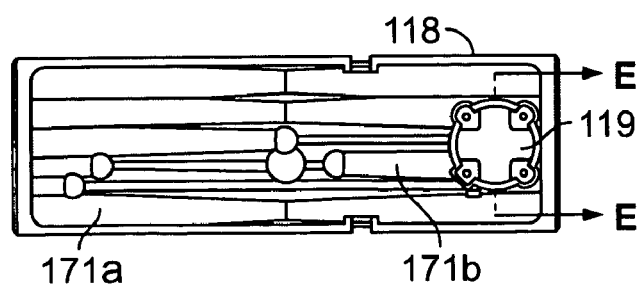
FIG. 11

ONE-PIECE MANIFOLD FOR A REVERSE OSMOSIS SYSTEM

RELATED APPLICATIONS

This application claims priority to provisional application No. 60/444,864, "ONE-PIECE MANIFOLD FOR A REVERSE OSMOSIS SYSTEM", filed Feb. 4, 2003, provisional application No. 60/456,153, "FLOW RESTRICTOR FOR A REVERSE OSMOSIS WATER FILTERING SYSTEM", filed Mar. 20, 2003, provisional application No. 60/519,364, "A REVERSE OSMOSIS WATER FILTERING SYSTEM", filed Nov. 12, 2003, and provisional application No. 60/537,363, "ONE-PIECE MANIFOLD FOR A ZERO WASTE REVERSE OSMOSIS SYSTEM", filed Jan. 20, 2004, the complete disclosures of each of which are incorporated herein by reference. This application is also related to patent application Ser. No. 10/692,398, "A REVERSE OSMOSIS WATER FILTERING SYSTEM", filed Oct. 23, 2003 which is incorporated herein by reference.

TECHNICAL FIELD

This disclosure relates to reverse osmosis systems.

BACKGROUND

A typical reverse osmosis water filtering system used in purifying water includes a semi-permeable membrane. Typically, a pressure is applied to incoming water that forces the incoming water through the membrane. The membrane filters impurities from the incoming water leaving purified water on the other side of the membrane called permeate water. The impurities left on the membrane are washed away by a portion of the incoming water that does not pass through the membrane. The impurities and the water used to wash them away from the membrane are called concentrate water.

SUMMARY

In one aspect, the invention is a one-piece manifold for a reverse osmosis system. The manifold includes a filter configured to receive water from a water port and a membrane configured to receive filtered water via a first conduit. The membrane is also configured to send permeate water to a reverse osmosis tank. The manifold also includes a flow restrictor configured to receive concentrate water from the membrane via a second conduit and to pass the concentrate water to a drain port.

In another aspect, the one piece manifold is adapted for use in a zero waste reverse osmosis system by passing the concentrate water to a water source port. This aspect may include a feature of having a shut-off valve modified for zero-waste.

In still another aspect, the invention is a flow restrictor defining a restricted flow path for liquid. The flow restrictor includes a housing defining an elongated conduit having a tapering conical wall defining a first screw thread and a water-channel thread extending along the tapering conical wall. The housing includes a first opening into a distal region of the conduit for receiving a flow of liquid and a second opening into a proximal region of the conduit. The flow restrictor also includes an axially elongated plug received into the conduit. A surface of the plug is opposed to the tapering conical wall defining a second screw thread and a tapering surface. The second screw thread is disposed in threaded engagement with the first screw thread defined by the conical wall of the housing. The opposed surface of the water-channel thread and the tapering surface of the plug are disposed in sealing engagement within the conduit and opposite to define a region for liquid flow. The housing with the water-channel thread and the tapering surface of the plug thereby cooperatively define a generally spiral liquid flow path along the water-channel screw thread and the tapering surface, for flow of liquid generally between the first opening and the second port for delivery of liquid from the conduit.

In still another aspect, the invention is the flow restrictor modified for flow of liquid generally between the first opening and a port defined by the flow restrictor for delivery of liquid from the conduit.

The aspects above may have one or more of the following advantages. A one-piece manifold provides many components of a standard reverse osmosis system into a single unit. Thus, tubular connections between these components are eliminated thereby providing a system that reduces the number leaks caused by these tubular connections. In addition, a one-piece manifold can be installed faster than the standard reverse osmosis system because there are less overall components.

A tapered plug within the flow restrictor can be manufactured using injection molding techniques compared to standard tubular flow restrictor designs. In addition, modifications can be further made in flow restrictor flow rate at little cost. For example, the flow rate of the restrictor can be controlled by maintaining the same insert length while adjusting the length of the plug.

Other features, objects and advantages will become apparent from the following detailed description when read in connection with the accompanying drawings.

DESCRIPTION OF THE DRAWINGS

FIG. 9 is a view of a filter bowl.

FIG. 10 is a view of a membrane housing.

FIG. 11 is a top view of the housing of the one-piece manifold.

DESCRIPTION

Figure 1:
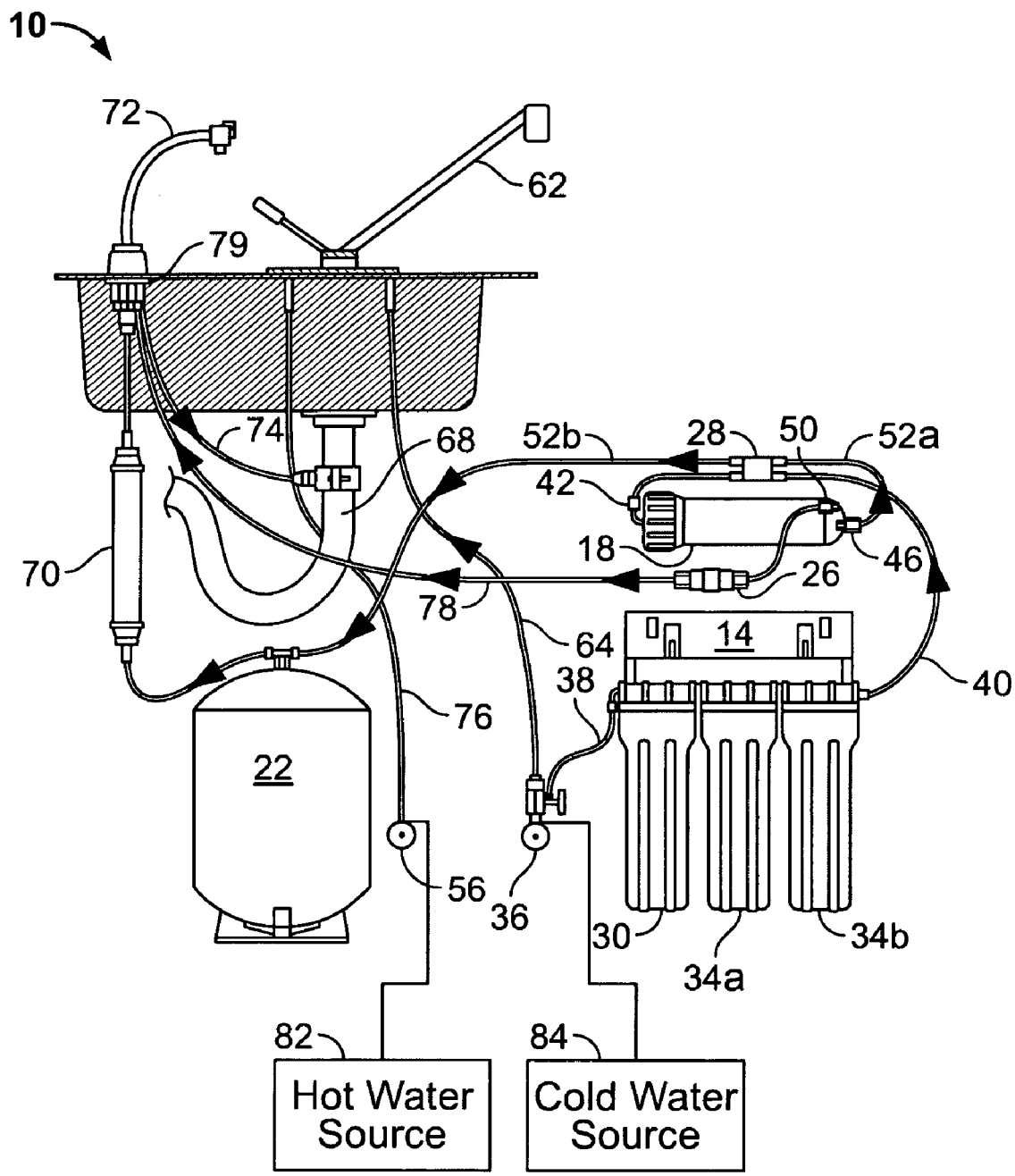
FIG. 1 is a diagrammatic plan view of a reverse osmosis water filtering system (Prior art).
Figure 2:
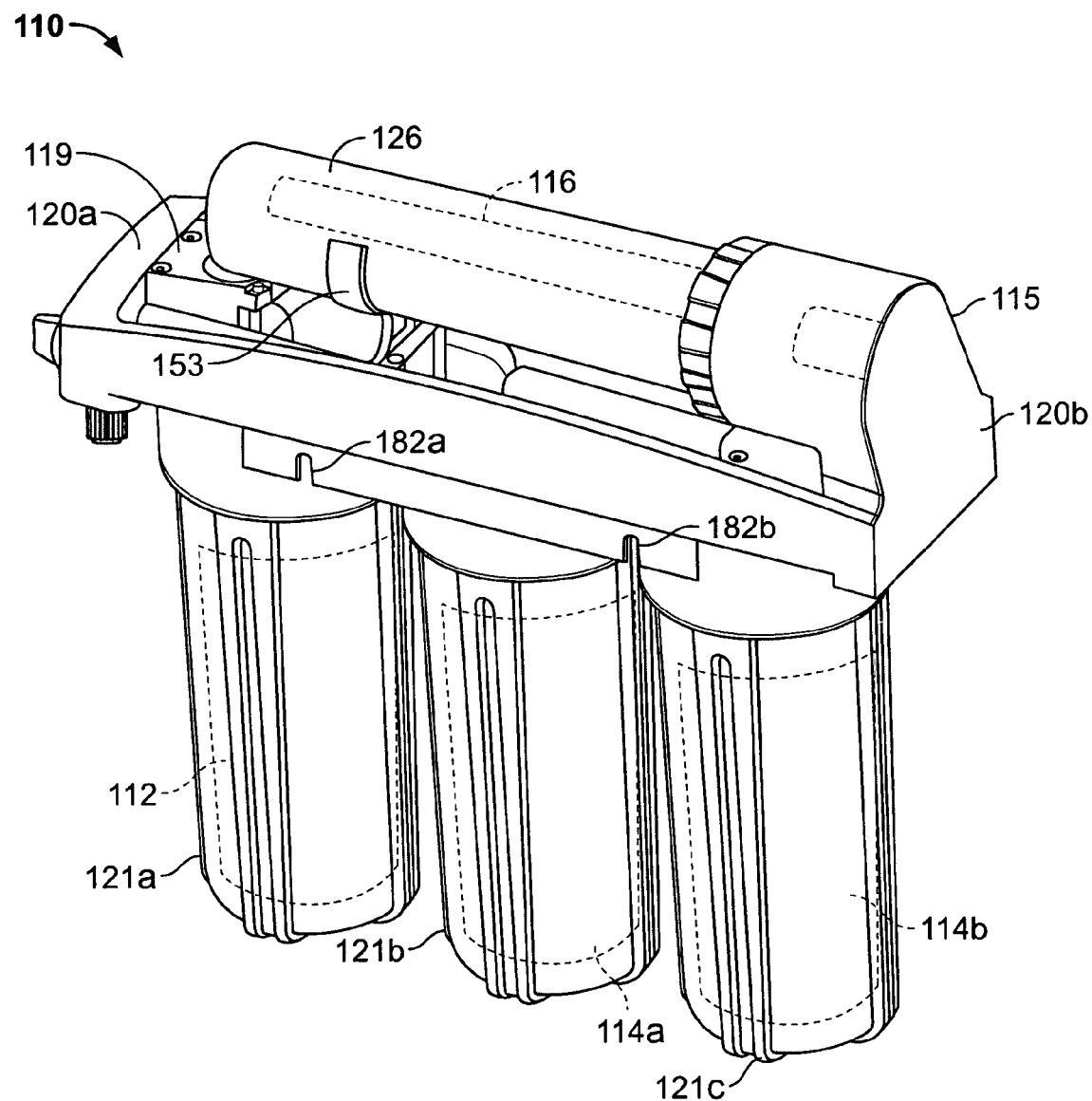
FIGS. 2–5 are views of a one-piece manifold.
Figure 3:
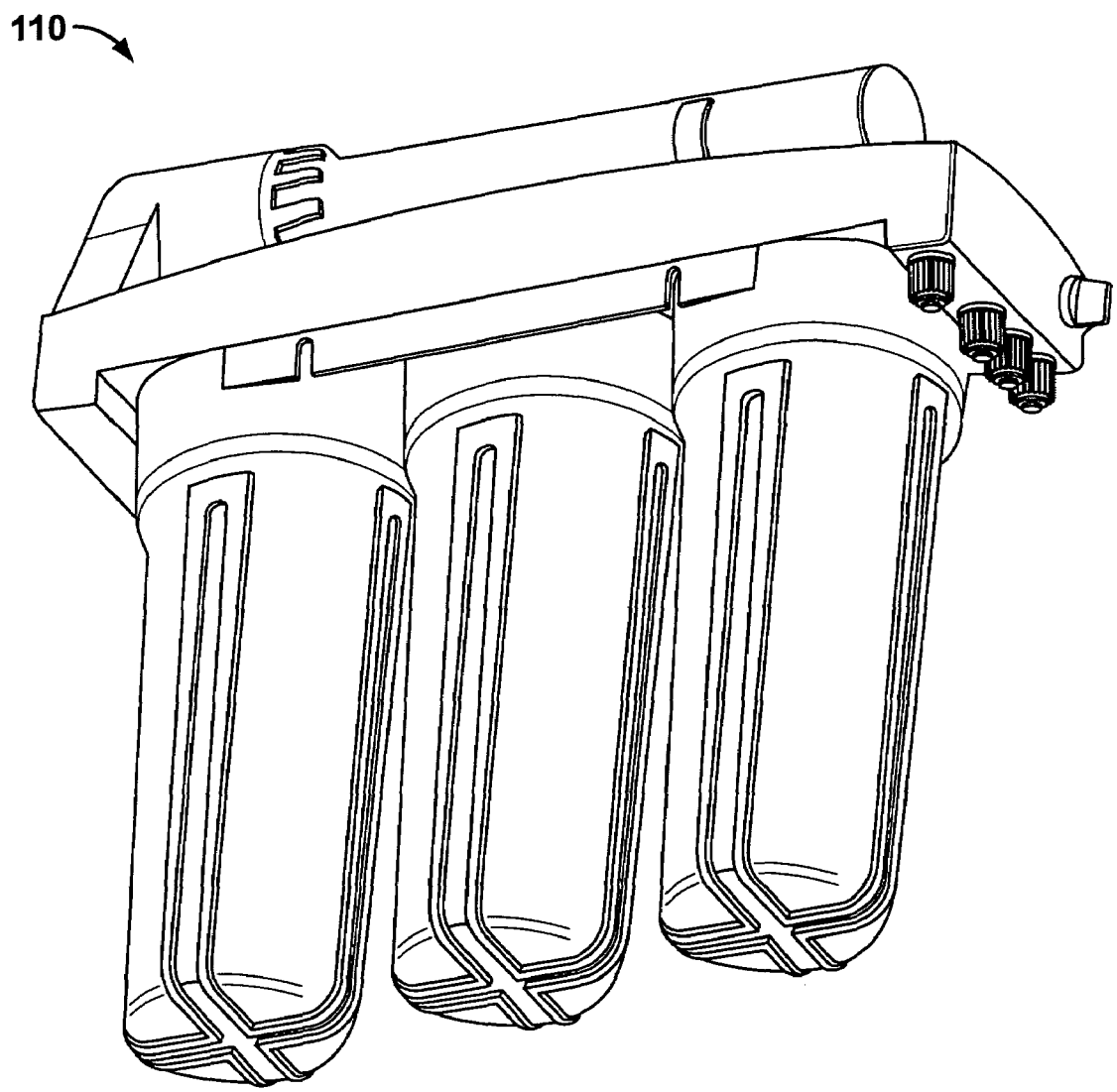
Figure 4:
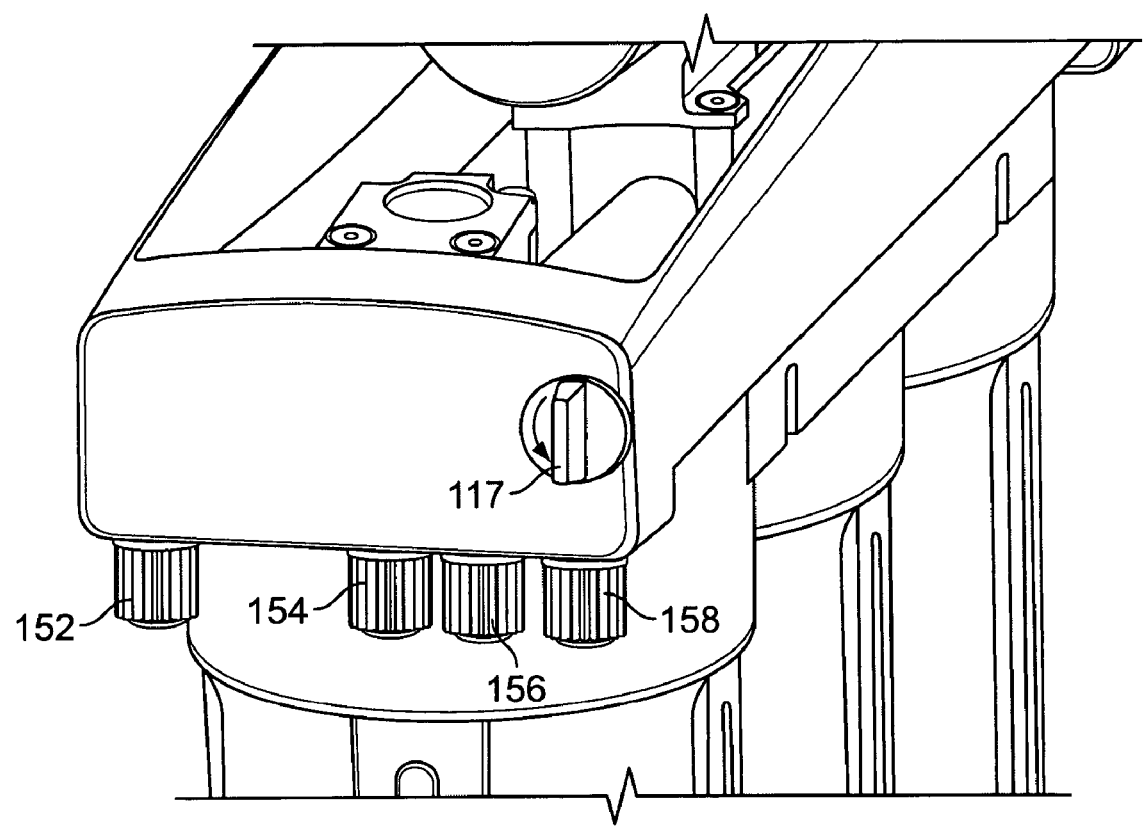
Figure 5:
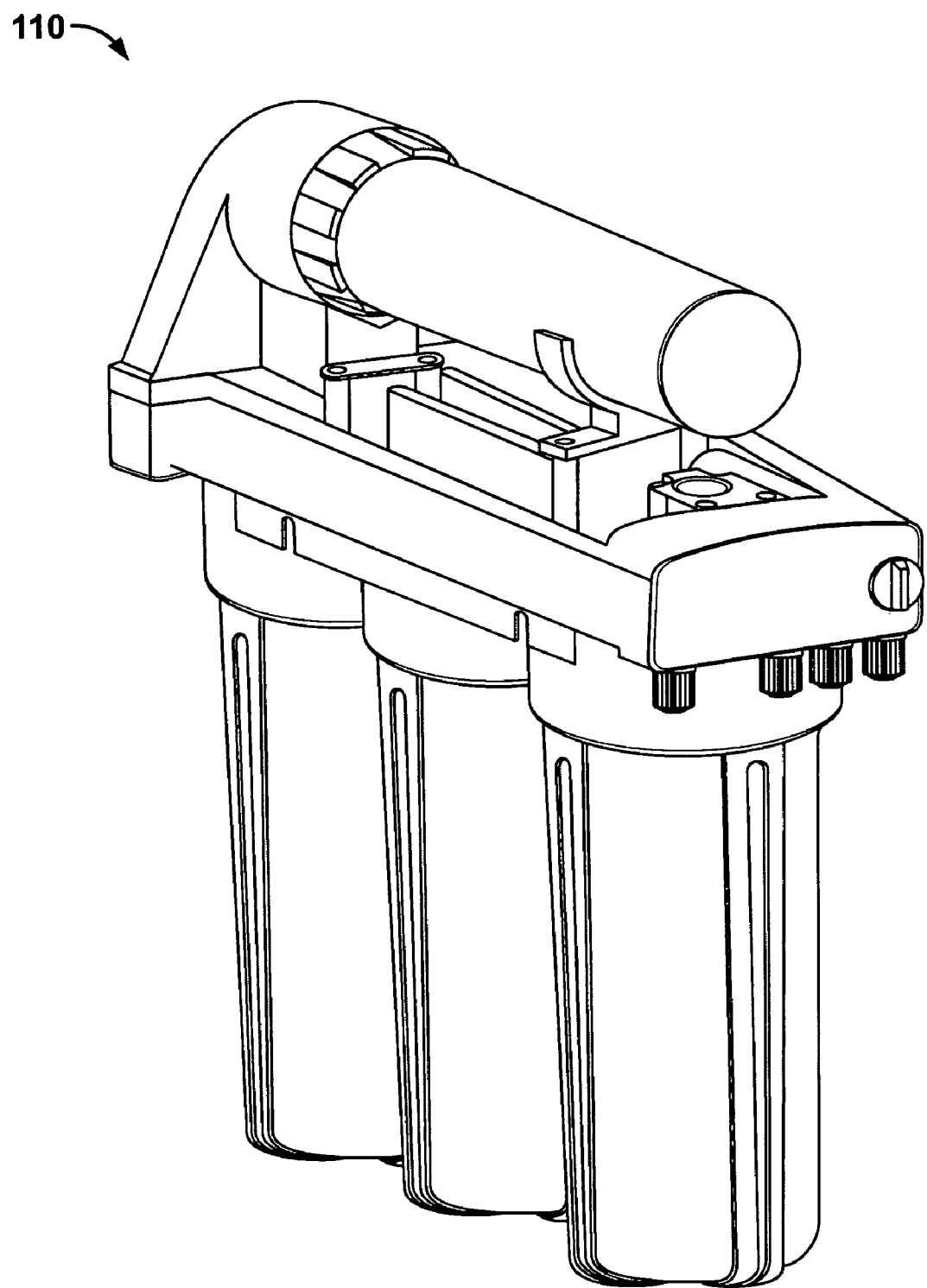
Figure 6:
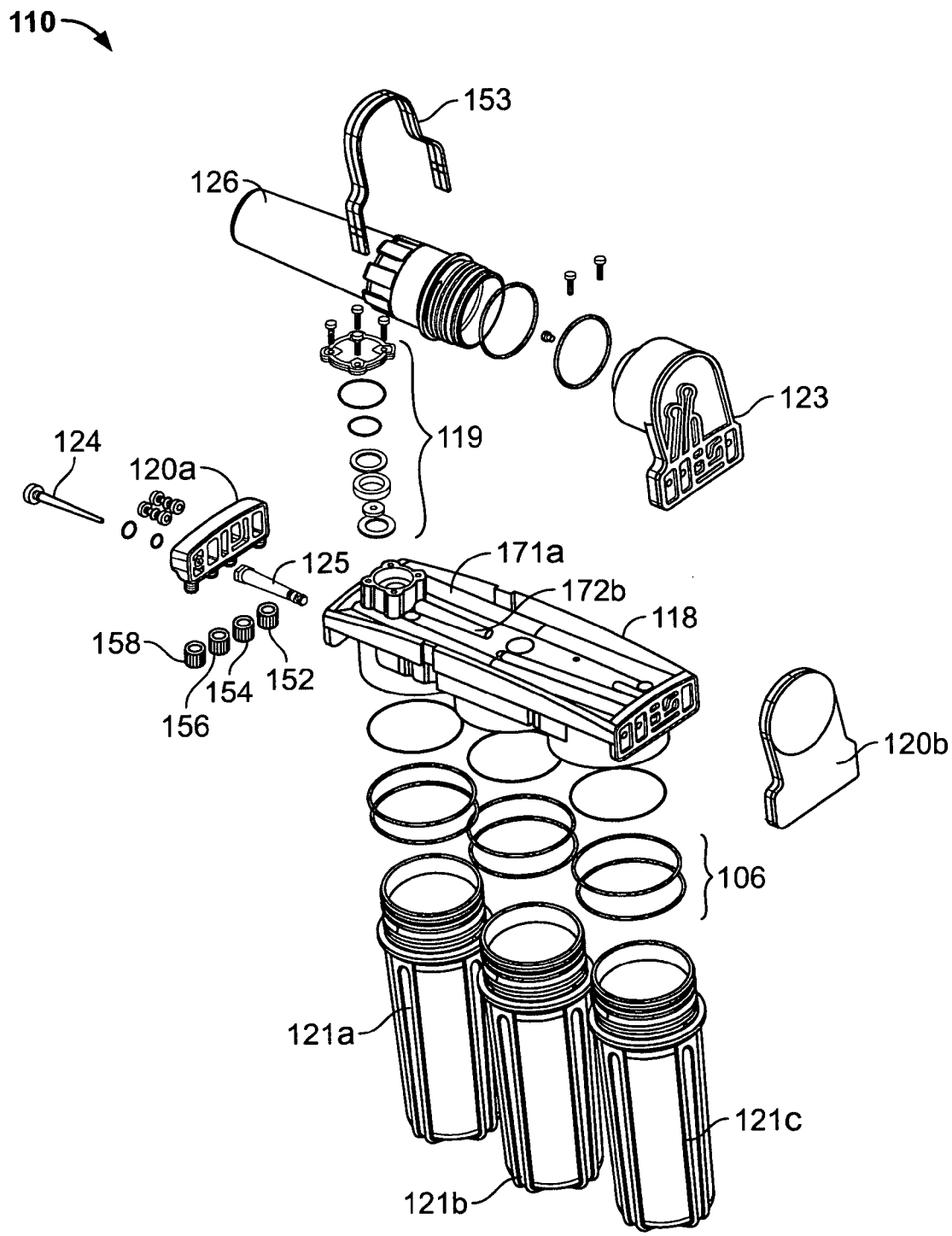
FIG. 6 is an exploded view of the one-piece manifold.
Figure 7:
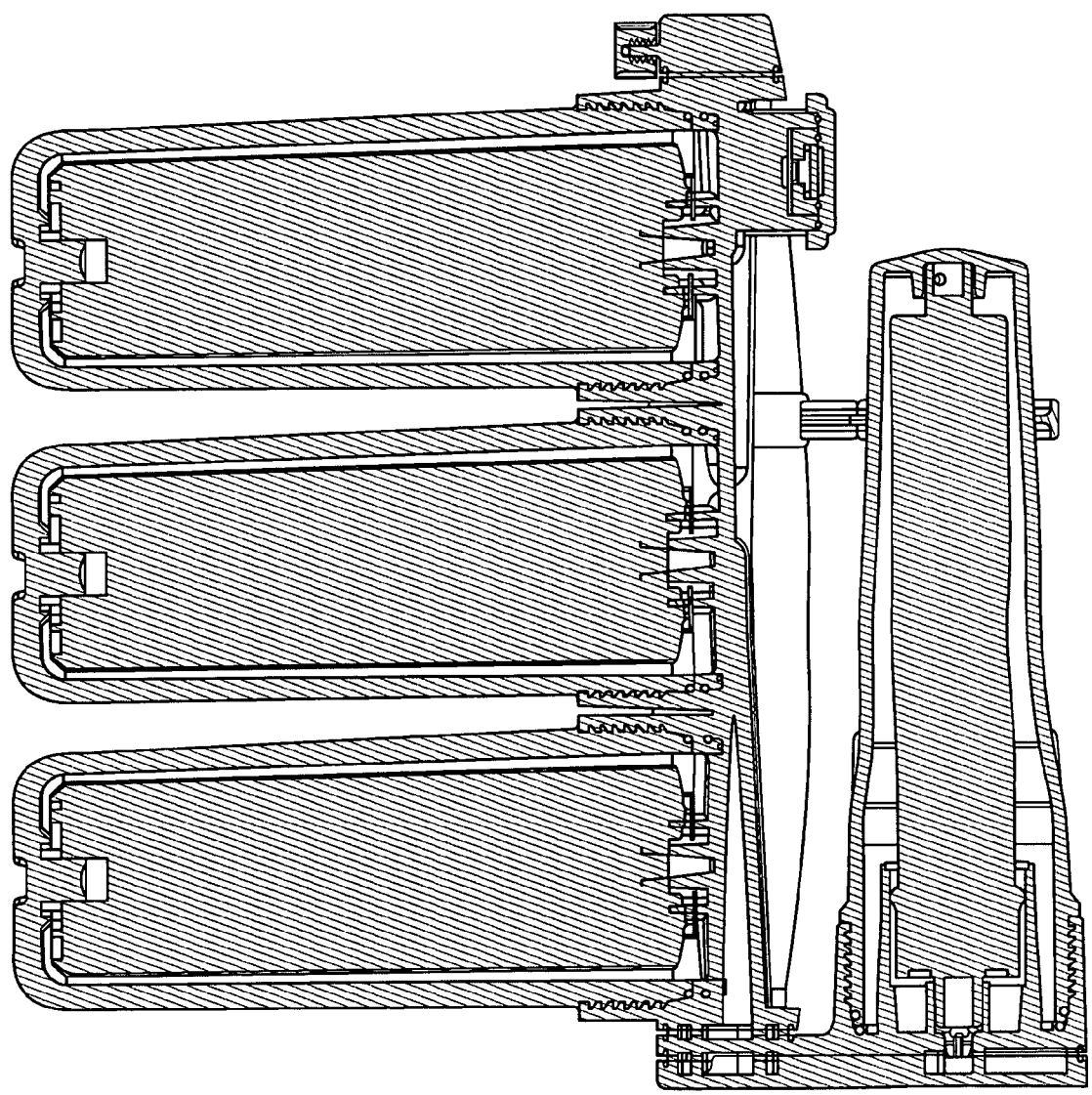
FIG. 7 is a cross-sectional view of the one-piece manifold.
Figure 8A:
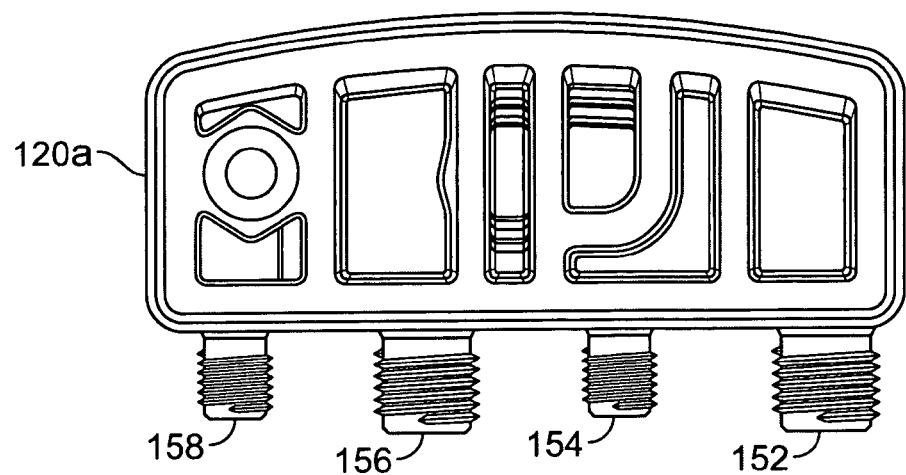
FIG. 8A is a view of one end cap.
Figure 8B:
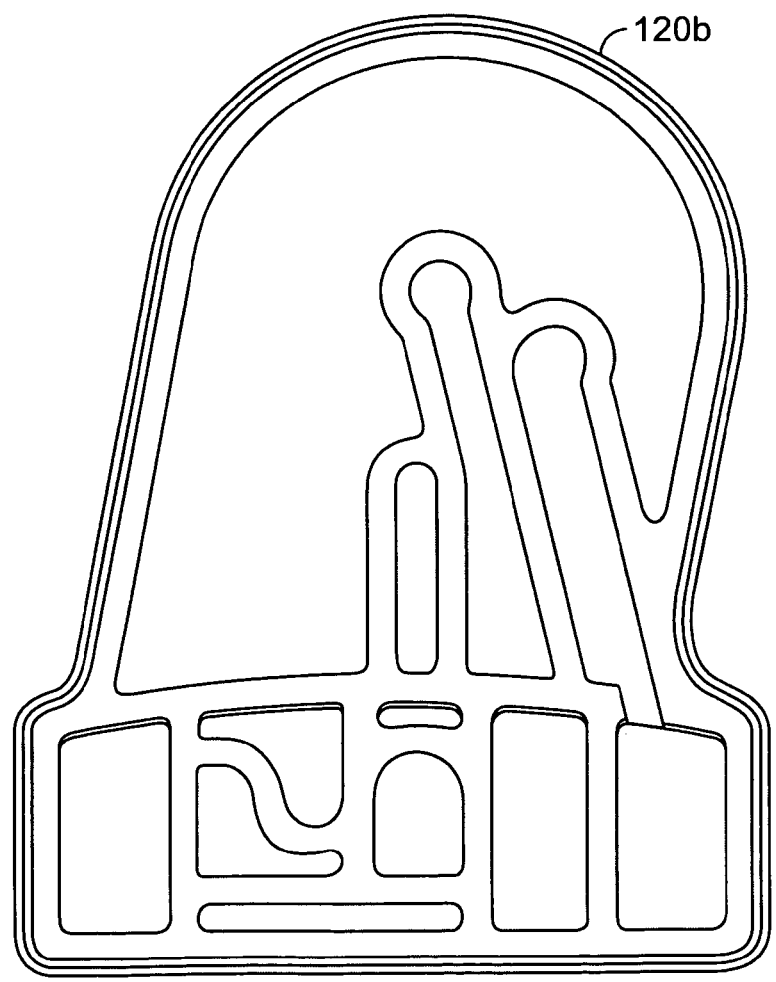
FIG. 8B is a view of another end cap.
Figure 12:
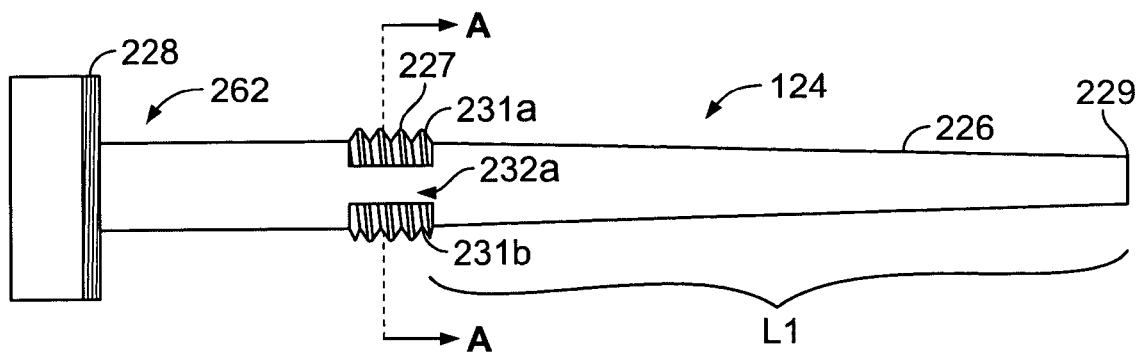
FIG. 12 is a side view of a flow restrictor plug.
Figure 13:
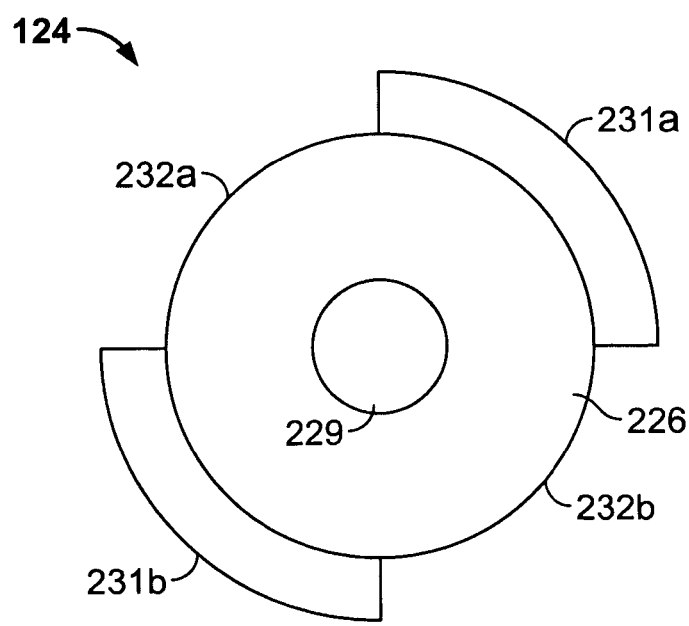
FIG. 13 is an end view of the flow restrictor plug of FIG. 12 looking from the tip end, with a section taken along the line A—A.
Figure 14:
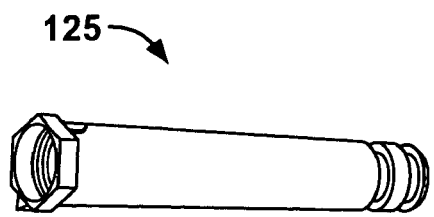
FIG. 14 is a view of a restrictor housing.
Figure 15:
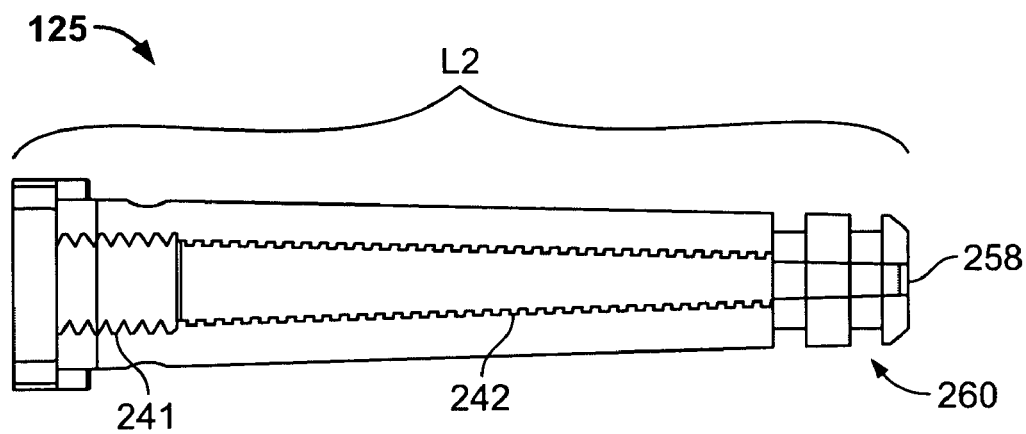
FIG. 15 is a side view, partially in section, of a flow restrictor housing with a cross-sectional view of threads within the housing.
Figure 16:
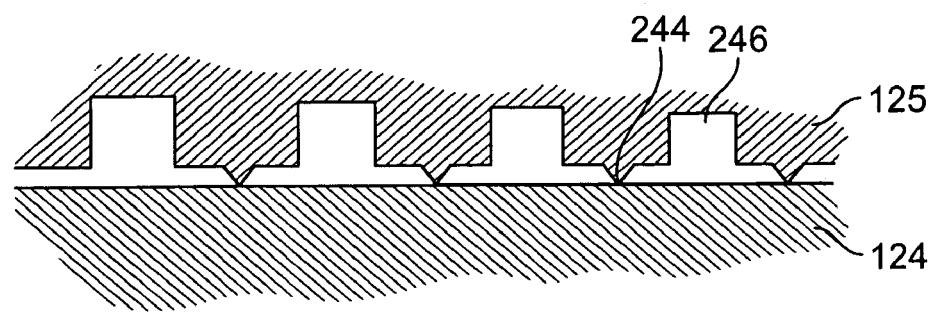
FIG. 16 is an enlarged cross-sectional view of an interface between the housing and the plug.
Figure 17A:
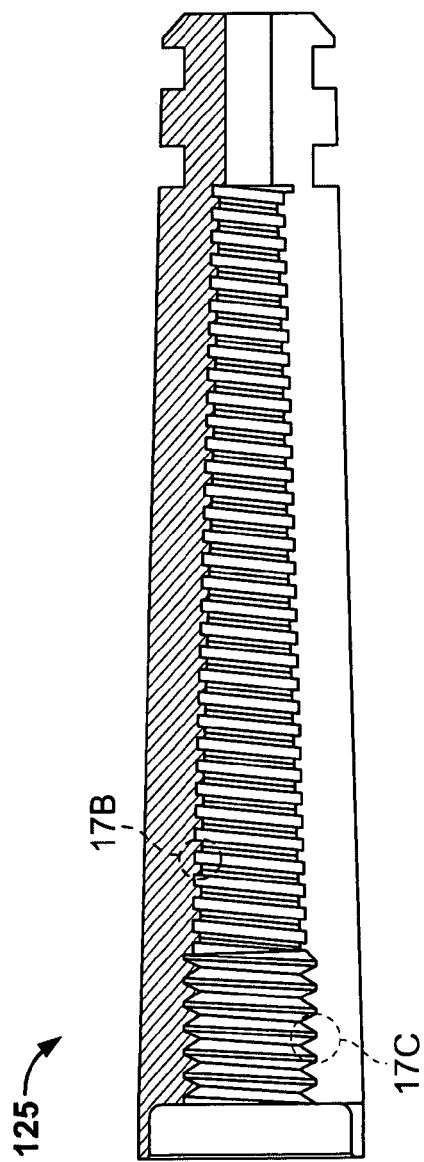
FIG. 17A is a side view of the flow restrictor housing with a view of the threads within the housing.
Figure 17D:
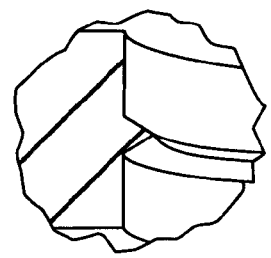
FIG. 17D is an enlarged view of threads taken along line D in FIG. 17C.
Figure 17C:
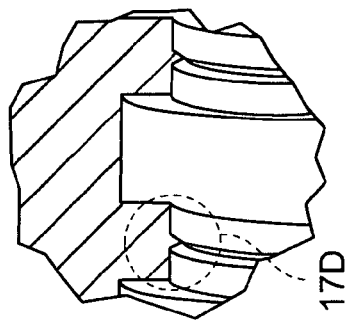
FIG. 17C is an enlarged view of threads taken along line C in FIG. 17A.
Figure 17B:
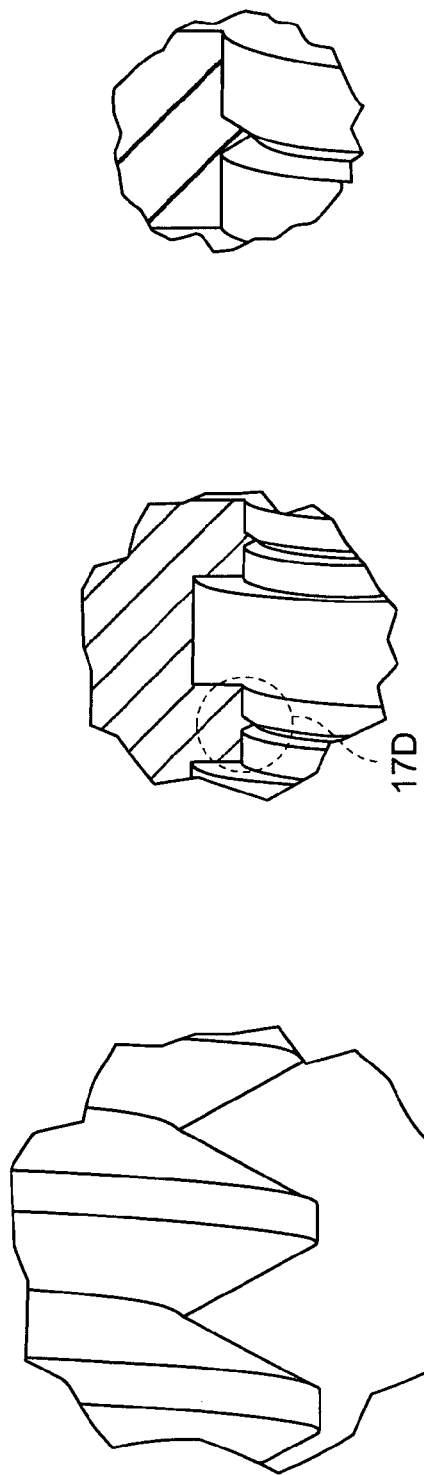
FIG. 17B is an enlarged view of threads taken along line B in FIG. 17A.
Figure 18:
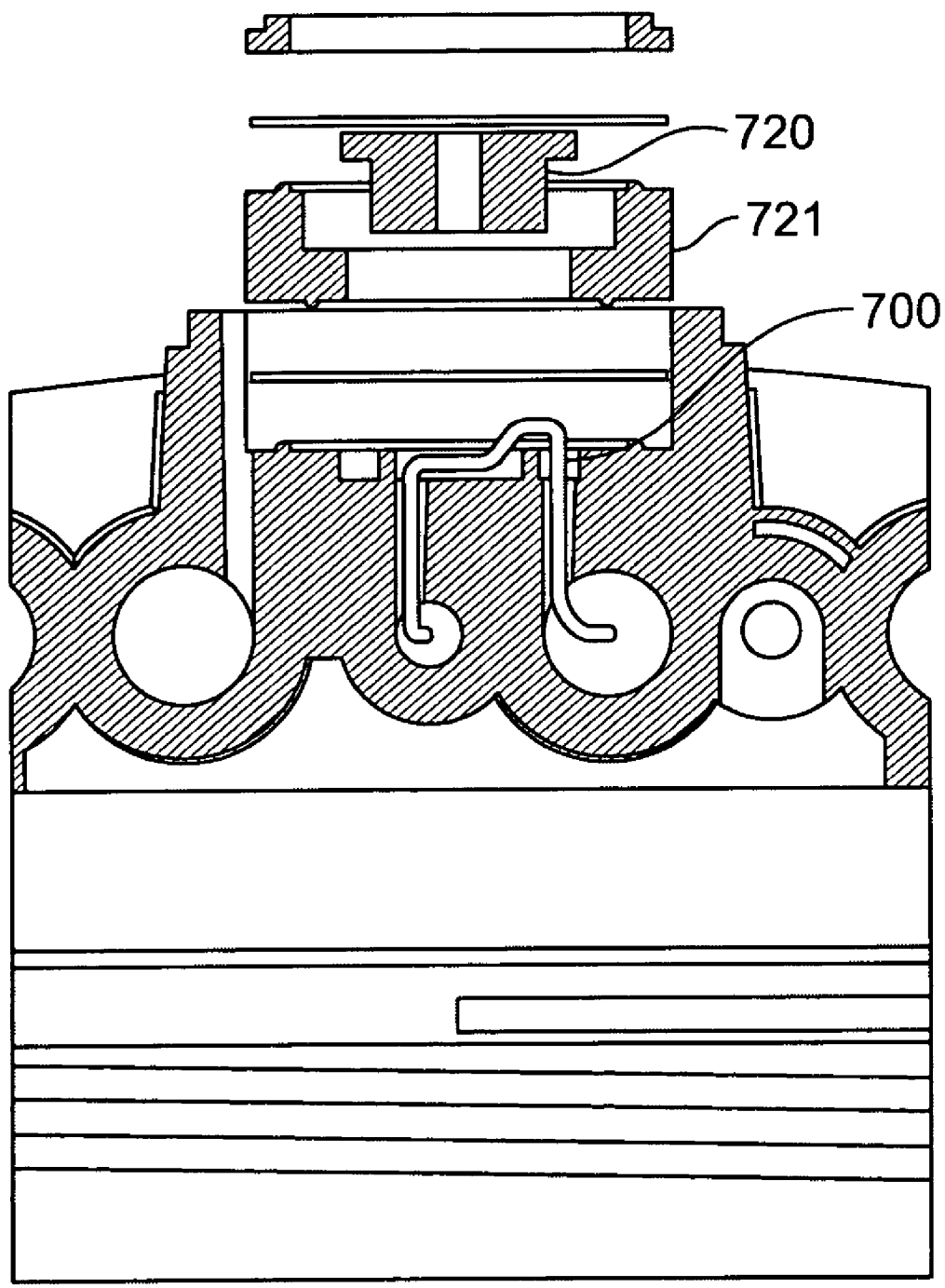
FIG. 18 is a cross-sectional exploded view of a shut-off valve in FIG. 11 taken along the lines E—E.
Figure 19:
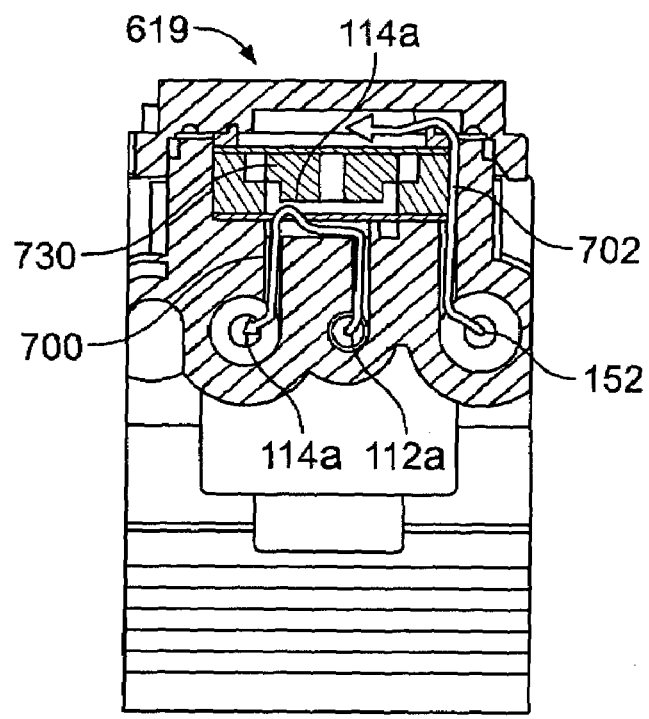
FIG. 19 is a cross-sectional view of an embodiment of the shut-off valve for use in a zero-waste reverse osmosis system.
Figure 20:
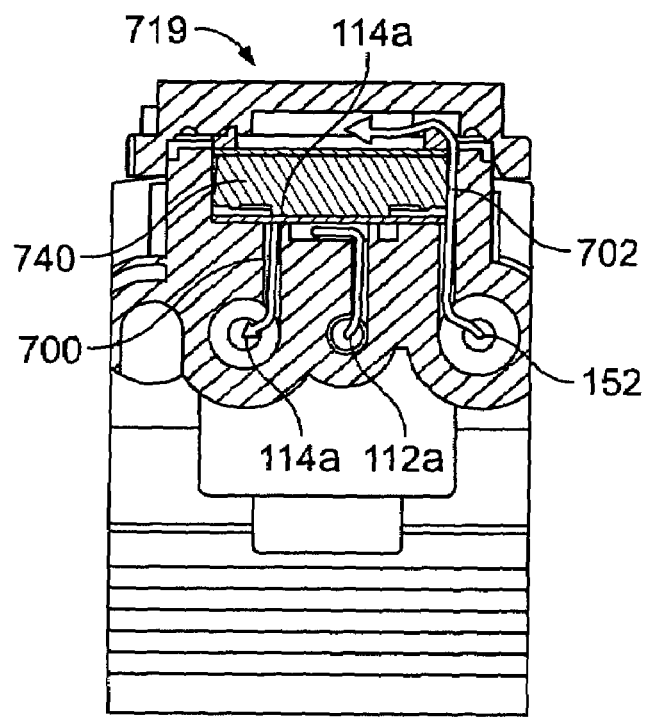
FIG. 20 is a cross-sectional view of a second embodiment of the shut-off valve for use in a zero-waste reverse osmosis system.
Figure 21:
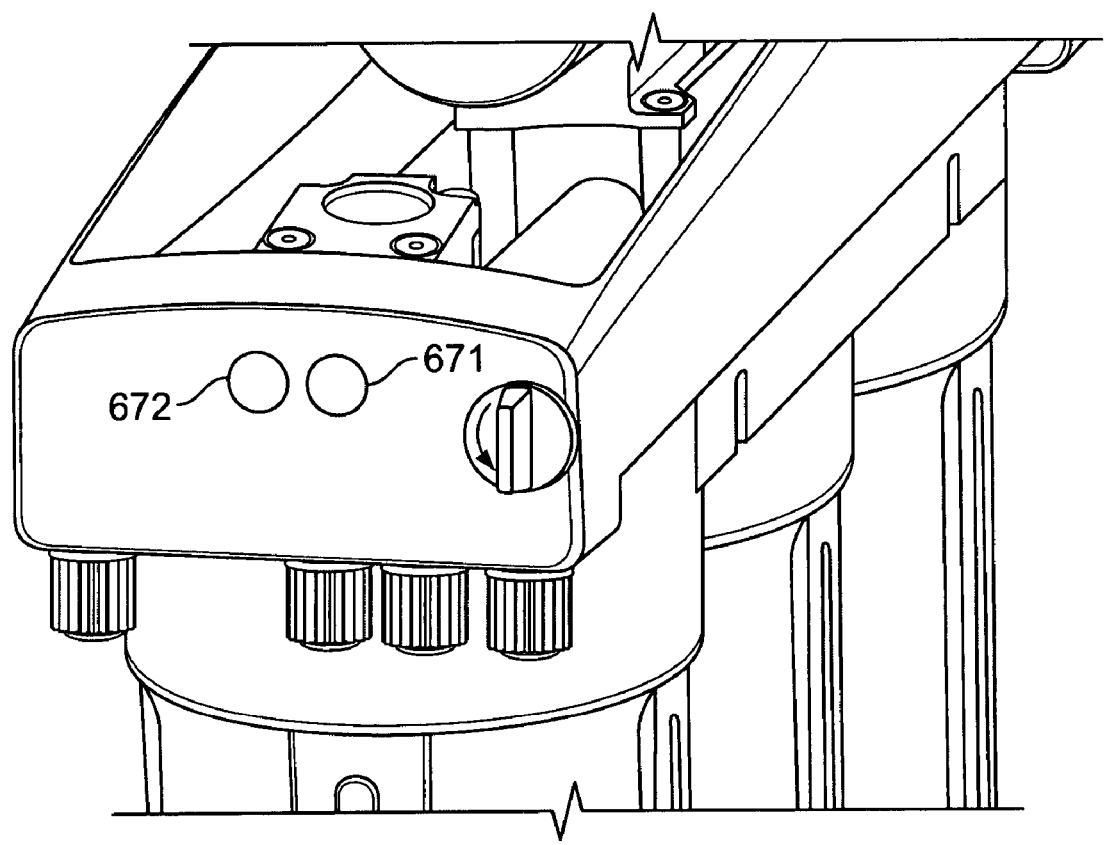
FIG. 21 is a one-piece manifold for zero-waste reverse osmosis having the shut-off valve of FIG. 20.

Referring to FIG. 1, a typical prior art reverse osmosis water filtering system 10 may be modified by combining components of system 10 into a single housing, a one-piece manifold 110 (FIG. 2), to minimize leaks that result from standard tubular connections between the components. System 10 includes a filter system 14, a reverse osmosis membrane 18, a reverse osmosis storage tank 22, a flow restrictor 26, a shut-off valve 28, a carbon filter 70 and an air gap faucet 72. Filter system 14 includes a sediment filter 30 and carbon filters (e.g., carbon filter 34a and carbon filter 34b). Intake water enters system 10 from a cold water angle stop valve 36, which is connected to a cold water source 84, and is routed through an intake tube 38 to filter system 14. Cold water angle stop valve 36 is also connected to a standard faucet 62 through a cold water faucet line 64 providing cold water to the standard faucet.

Sediment filter 30 removes sediment such as sand and dirt and the like from the intake water. Carbon filters 34a and 34b remove chlorine and other contaminants that cause bad color, odor and taste. The filtered water is routed to membrane 18 through a water tube 40.

Membrane 18 includes three ports: an intake port 42, a permeate outlet port 46 and a concentrate outlet port 50. Intake port 42 receives filtered intake water from filter system 14 through water tube 40. Permeate water is routed from outlet port 46 through permeate tubes 52a and 52b and shut-off valve 28 to tank 22 to be stored under pressure. Shut-off valve 28 is automatic and stops the flow of water to membrane 18 and to tank 22. When air gap faucet 72 is opened by a user, permeate water is forced from tank 22 and through a carbon filter 70 though the faucet 72 for use by a user. Concentrate water is routed from outlet port 50 through a waste water tube 78, having a flow restrictor 26, through a drain tube 74 for subsequent disposal down drain 68.

Referring to FIGS. 2–11, a one-piece manifold 110 combines a sediment filter, carbon filters, a membrane, a flow restrictor and a shut-off valve into a single unit within a reverse osmosis water filtering system.

One-piece manifold 110 includes a sediment filter 112, two carbon filters 114a and 114b, a membrane 116, a check valve 115, a flow restrictor 117, and a shut-off valve 119 all encased in a housing or manifold 118 made of a light but solid material (e.g., polypropylene, plastic, glass, talc). Each filter 112, 114a and 114b is located within its own separate filter bowl 121a, 121b and 121c, respectively. The one-piece manifold 110 is injected molded. Thus, instead of having tubes interconnecting the components of the reverse osmosis system like traditional systems, the one-piece manifold system 110 uses grooves and conduits (e.g., conduit 171a and conduit 171b) molded in the housing 118, thereby reducing the potential for leaks to occur, e.g. as compared to standard tubing connections.

Water enters system 110 via an intake port 154 and through shutoff valve 119. The water can pass through sediment filter 112 and/or through each of the carbon filters 114a and 114b, depending on the mold configuration. End caps 120a and 120b located on each end of the manifold define grooves (not shown) that can be manufactured in different desired configurations to control the flow of the water between membrane 116 and each of the filters 112, 114a and 114b. Thus, the reconfigurable end caps alter the order of filtration through the filters 112, 114a and 114b and membrane 116. For example, water can flow through sediment filter 112 and one carbon filter and then to membrane 116. Other embodiments include routing the water from one of the carbon filters, carbon filter 114a, for example, to membrane 116 and then to the other carbon filter, carbon filter 114b. The end cap 120a and membrane vessel cap 123 are plate welded to housing 118 and an end cap 120b, respectively.

Membrane 116 is positioned within a membrane housing 126 that defines threads that screw onto the membrane vessel cap 123. A clip 153 over the membrane housing supports the membrane housing if the membrane housing 126 is used as a handle e.g., to lift the entire unit when the housing is full of water.

The water exits the membrane in one of three paths. The first path carries the permeate water through the check valve 115 through to a tank port 156. The tank port 156 includes a ⅜ inch fitting for connection to a ¼ inch inside diameter tube that allows the water to flow faster from the tank to the faucet. The second path carries water from the tank to a faucet port 152. Faucet port 152 includes a ⅜ inch fitting. The third path carries the concentrate water to the flow restrictor 117.

Referring next to FIGS. 12–17D, flow restrictor 117 consisting of a plug 124 and a hollow housing or insert 125 constructed to receive plug 124. Plug 124 includes a tapered shaft 226 having a length $L_1$, e.g. about 1.5 inches, a screw thread section 227, and an O-ring 228 at a proximal end 262. Tapered shaft 226 has a taper angle of approximately 1.5 degrees. Screw thread section 227 includes screw threads 231a and 231b separated from one another by a first gap 232a and a second gap 232b. Without gaps 232a and 232b, screw threads 231a and 231b would form one continuous thread around the circumference of plug 124. Each gap 231a and 232b extends 90 degrees about the circumference of plug 124. Plug 124 is made of a suitable material such as polyethylene and the like so it is softer than the housing material.

Housing 125, having a length, $L_2$, e.g., about 3 inches, includes screw thread 241 and water-channel thread 242. Water-channel thread 242 includes a pointed end 244, with a gap 246 between the thread that is a part of a water-flow path. Housing 125 is made of a suitable material such as ABS plastic and the like so it is harder than the plug material.

Plug 124 and housing 125 are interengaged by screw threads 231a and 231b with screw thread 241 initially and then interengaged by screw thread 244 with plug material as the plug is screwed in further, which provide a water tight seal. Tapered shaft 226 extends into housing 125 about ½ its length, $L_2$. Flow restrictor 117 is constructed so that the water-channel thread 242 seals around tapered shaft 226 to provide a sealed gap 246 forming a spiral flow path for water along and around the tapered shaft. In particular, point 244 of water-channel thread 242 slightly penetrates into the opposed surface of the tapered shaft 226 to ensure the tight seal.

The flow path of the water through flow restrictor 117 starts by passing through an aperture 258 at distal end 260 of the housing 125 and continues into housing 125 until the water comes in contact with the tip region 229 of the tapered plug 124. The volume occupied by tapered shaft 226 within housing 125 directs the water into sealed gap 246. The water continues to spiral around and along the tapered shaft following the water-channel thread until the water reaches threads 231a, 232b and 241. The water is forced through gaps 232a and 232b and into the end cap 120a and through a drain port 158. However, in other embodiments, the flow can be restricted in the opposite direction.

The flow path cross section is designed to restrict water flow using capillary characteristics of water, while at the same time providing a large enough flow cross section to prevent small particles from clogging the flow path.

The tapering of plug 125 from the proximal end 262 to the distal end region 229, and the use of water-channel thread 242, allows the flow restrictor to be injected molded very easily and inexpensively. For example, after plug 124 has been injected molded, it can be easily released from a mold by rotating the plug a few turns and then drawing the plug from the mold. The tooling also allows the flow restrictor to be configured for "stand alone" use as a flow restrictor for other common reverse osmosis water filtration systems.

Water-channel thread 242 within flow restrictor 117 controls the flow of the water by generating a capillary action around tapered shaft 226 to restrict the flow of water. Thus, the flow restrictor restricts the water, unlike the traditional winding tube design. The length, i.e., pitch, of the thread can be altered to change the degree of flow restriction.

In other embodiments, the length, $L_1$, of tapered shaft 226 can also be modified to control flow rate. For example, housing 125 can have the same dimensions, thus saving on manufacturing costs, and the length of plug 125 can be modified to be shorter, thereby to increase the flow rate through the flow restrictor, or longer, thereby to reduce the flow rate through the flow restrictor.

The one-piece manifold is mountable by screwing screws (not shown) through each of the screw openings 182a and 182b.

The advantages of the one-piece are not limited to the following. The one-piece manifold has an easy to change membrane by simply unscrewing the membrane housing 126. The one-piece manifold integrates the check valve for permeate water. The one-piece manifold includes high flow water paths from the tank inlet to the faucet outlet. The filter bowls 121 have two "slip" type O-rings each 106 of which the top o-ring will also seal in compression, and an end stop (not shown) for the threads so that the bowls cannot be over tightened and will maintain a good seal.

Referring to FIGS. 18A, 18B, and 19 to 21, the one-piece manifold 110 is modified from a standard configuration (a reverse osmosis system that empties concentrate water into a drain) to a zero-waste reverse osmosis system that empties concentrate water into a water source by modifying the shut-off valve 119. Details of converting a standard reverse osmosis system to a zero-waste reverse osmosis system is described in patent application Ser. No. 10/692,398, "A REVERSE OSMOSIS WATER FILTERING SYSTEM", filed Oct. 23, 2003 and is incorporated in its entirety herein.

Without modification, shut-off valve 119 stops the flow of intake water based on the pressure in the reverse osmosis tank. Shut-off valve 119 is a barrier between an intake water flow path 700 and a permeate water flow path 702. The shut-off valve includes a piston 720 and a spacer 721. Intake water flow path 700 is opened or closed by the piston 720 depending on the water pressure in the tank. When the piston 720 is closed, the flow of intake water from the filter 112 is prevented from flowing to the filter 114a.

In one embodiment of a zero-waste reverse osmosis system, a modified shut-off valve 619 includes a piston 730 having a shorter length than piston 720 and replaces piston 720. The intake water path 700 will continuously flow from filter 112a to filter 114a independent of the pressure in the reverse osmosis tank due to the piston 730 stopping before it can close the water path 700 to the next filter 114a. An external pump of a zero-waste reverse osmosis system (not shown) pumps into the normal inlet port 154.

In another embodiment, a shut-off valve 719 is modified to include a spacer 740, instead of piston 720 and spacer 721, so that spacer 740 is long enough so that the incoming water from filter 112 does not flow to filter 114a regardless of the pressure within the reverse osmosis tank. Instead, the water flows out through a zero-waste port 671 and in through a zero-waste port 672 and continues on to filter 114a.

Figure 22A:
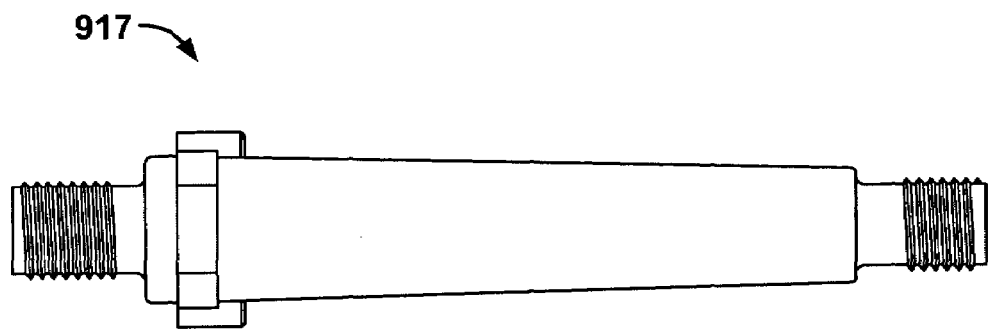
FIG. 22A is a flow restrictor
Figure 22B:
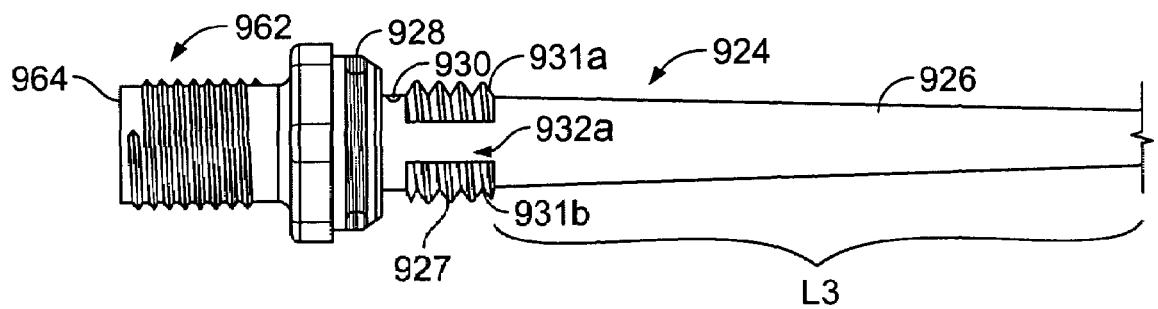
FIG. 22B is a plug of the flow restrictor of FIG. 22A.
Figure 22C:
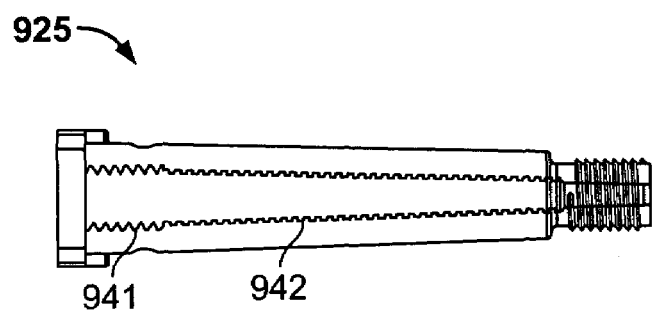
FIG. 22C is a housing of the flow restrictor of FIG. 22A.

Referring to FIGS. 22A to 22C, in other embodiments, the flow restrictor may be modified for systems that do not include one-piece manifolds. For example, a flow restrictor 917 may be used in system 10 or in zero-waste reverse osmosis systems such as those described in patent application Ser. No. 10/692,398, "A REVERSE OSMOSIS WATER FILTERING SYSTEM", filed Oct. 23, 2003 and is incorporated in its entirety herein. The flow restrictor 917 includes a plug 924 and a housing 925.

Plug 924 includes a tapered shaft 226 having a length $L_3$, e.g., about 1.5 inches, a screw thread section 927, an o-ring 928 and an aperture 930 that leads into a proximal end 962 forming a port 964. Screw thread section 927 includes screw threads 931a and 931b separated from one another by a first gap 932a and a second gap (not shown). Plug 924 and housing 925 are interengaged by screw threads 931a and 931b with screw thread 941, which along with o-ring 928 provide a water tight seal. Water flow is similar to flow restrictor 117 except after water passes through the first and second gaps, the water is forced through aperture 930 and out port 964.

There has been described novel apparatuses and techniques for reverse osmosis systems. It is evident that those skilled in the art may now make numerous modifications and uses of and departures from specific apparatus and techniques herein disclosed without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. A flow restrictor defining a restricted flow path for liquid, said flow restrictor comprising:
   a housing defining an elongated conduit having a tapering conical wall defining a first screw thread and a water-channel thread extending therealong including generally between a first opening into a distal region of the conduit for receiving a flow of liquid and a second opening into a proximal region of the conduit, and
   an axially elongated plug received into said conduit, with a surface of said plug opposed to said tapering conical wall and defining a second screw thread and a smooth tapering surface, said second screw thread disposed in threaded engagement with said first screw thread defined by said tapering conical wall of said housing, and opposed surfaces of said water-channel thread of said housing and said tapering surface of said plug being disposed in sealing engagement within said conduit, said water-channel thread of said housing and said tapering surface of said plug cooperatively defining a generally spiral liquid flow path along said conduit for flow of liquid generally between said first opening and said second opening for delivery of liquid from the conduit;

wherein the plug comprises a first material, the housing compnses a second material harder than the first material, and sealing engagement comprises penetrating engagement of the water-channel thread of the housing with the tapering surface of the plug.

2. The flow restrictor of claim 1, wherein said plug is received into said conduit through said second opening.

3. The flow restrictor of claim 1, wherein said plug and said housing are injection molded.

4. The flow-restrictor of claim 3, wherein said plug comprises polyethylene and the housing comprises ABS plastic.

5. The flow restrictor of claim 1, wherein the water-channel thread includes a pointed protrusion in penetrating engagement with the tapering surface of the plug.

6. The flow restrictor of claim 1, wherein the plug comprises a third screw thread, the second screw thread and the third screw thread are separated by a gap.

7. The flow restrictor of claim 1, wherein the tapered shaft of the plug has a taper angle of about 1.5 degrees.

8. The flow restrictor of claim 1, wherein the housing has a length that is about two times a length of the plug.

9. The flow restrictor of claim 1, wherein about one half of the tapered shaft of the plug extends into the conduit of the housing.

10. The flow restrictor of claim 1, wherein the flow path cross section is adapted to restrict water flow using capillary characteristics of water and prevent small particles from clogging the flow path.

11. A flow restrictor defining a restricted flow path for liquid, said flow restrictor comprising:

a housing defining an elongated conduit having a tapering conical wall defining a first screw thread and a water-channel thread extending therealong including generally between a first opening into a distal region of the conduit for receiving a flow of liquid and a second opening into a proximal region of the conduit, and an axially elongated plug received into said conduit, with a surface of said plug opposed to said tapering conical wall and defining a second screw thread and a smooth tapering surface, said second screw thread disposed in threaded engagement with said first screw thread defined by said tapering conical wall of said housing, and opposed surfaces of said water-channel thread of said housing and said tapering surface of said plug being disposed in sealing engagement within said conduit, said water-channel thread of said housing and said tapering surface of said plug cooperatively defining a generally spiral liquid flow path along said conduit for flow of liquid generally between said first opening and a port defined by said flow restrictor for delivery of liquid from said conduit;

wherein the plug comprises a first material, the housing comprises a second material harder than the first material, and sealing engagement comprises penetrating engagement of the water-channel thread of the housing with the tapering surface of the plug.

12. The flow restrictor of claim 11, wherein said plug, at least in part, defines an aperture interconnecting said conduit and said port.

13. The flow restrictor of claim 12, wherein said port is defined, at least in part, by said plug.

14. The flow restrictor of claim 11, wherein the tapered shaft of the plug has a taper angle of about 1.5 degrees.

15. The flow restrictor of claim 11, wherein the plug comprises a third screw thread, the second screw thread and the third screw thread are separated by a gap.

16. The flow restrictor of claim 11, wherein the plug is made of polyethylene and the housing is made of ABS plastic.

17. The flow restrictor of claim 11, wherein the housing has a length that is about two times a length of the plug.

18. The flow restrictor of claim 11, wherein about one half of the tapered shaft of the plug extends into the conduit of the housing.

19. The flow restrictor of claim 11, wherein the flow path cross section is adapted to restrict water flow using capillary characteristics of water and prevent small particles from clogging the flow path.

20. A flow restrictor comprising:

a housing defining an elongated conduit defining a water-channel thread; and an axially elongated plug threaded into the conduit, the plug having a smooth surface opposite the water-channel thread, wherein the water-channel thread of the housing and the smooth surface of the plug are in sealing engagement and cooperatively define a liquid flow path along the conduit;

wherein the plug comprises a first material, the housing comprises a second material harder than the first material, and sealing engagement comprises penetrating engagement of a harder radially inwardly extending pointed protrusion of the water-channel thread of the housing with the softer smooth surface of the plug.

* * * * *